(12) United States Patent
Freudelsperger

(10) Patent No.: US 6,892,509 B2
(45) Date of Patent: May 17, 2005

(54) COMMISSIONING DEVICE WITH INTERMEDIATE STORAGE AREAS IN THE FORM OF TILTABLE CONTAINERS ARRANGED ON A SHELF

(75) Inventor: Karl Freudelsperger, Hart bei Graz (AT)

(73) Assignee: Knapp Logistik Automation GmbH, Hart bei Graz (AT)

( * ) Notice: Subject to any disclaimer, the term of this patent is extended or adjusted under 35 U.S.C. 154(b) by 0 days.

(21) Appl. No.: 10/311,789

(22) PCT Filed: Jun. 19, 2001

(86) PCT No.: PCT/EP01/06907

§ 371 (c)(1),
(2), (4) Date: Jul. 14, 2003

(87) PCT Pub. No.: WO01/98183

PCT Pub. Date: Dec. 27, 2001

(65) Prior Publication Data

US 2004/0025470 A1 Feb. 12, 2004

(30) Foreign Application Priority Data

Jun. 20, 2000 (DE) ........................................ 100 29 323

(51) Int. Cl.[7] .............................................. B65B 57/20
(52) U.S. Cl. .............................. 53/237; 53/240; 53/247
(58) Field of Search .......................... 53/235, 237, 240, 53/247; 222/144; 221/92, 186, 188

(56) References Cited

U.S. PATENT DOCUMENTS

| 4,870,799 A | 10/1989 | Bergerioux |
| 6,208,908 B1 * | 3/2001 | Boyd et al. ................. 700/216 |

FOREIGN PATENT DOCUMENTS

| AT | 403 031 | 10/1997 |
| AT | 403 570 | 3/1998 |
| WO | WO 96/36547 | 11/1996 |
| WO | WO 97/03903 | 2/1997 |

* cited by examiner

Primary Examiner—Scott A. Smith
Assistant Examiner—Gloria R. Weeks
(74) Attorney, Agent, or Firm—McGlew and Tuttle, P.C.

(57) ABSTRACT

Tiltable containers (3) with a filling opening (4) are arranged horizontally in the longitudinal direction of a shelf. A lower conveyor (5), is associated with the tiltable containers (3) in the longitudinal direction of the shelf. One or more containers (3) are filled with selected products preferably simultaneously in a filling position (F) of the containers. The selected products are released onto the conveyor (5) by tilting the filled containers into a tilted position (K). Each tiltable container (3) has, aside from the filling opening (4), a open container side (7), which is kept closed in the filling position (F) of the container by a stationary shelf wall (8) and is open in the tilted position (K) that is away from the stationary shelf wall (8) and forms the release opening of the container (3), from which the products of the container fall onto the conveyor (5).

20 Claims, 5 Drawing Sheets

Fig._4
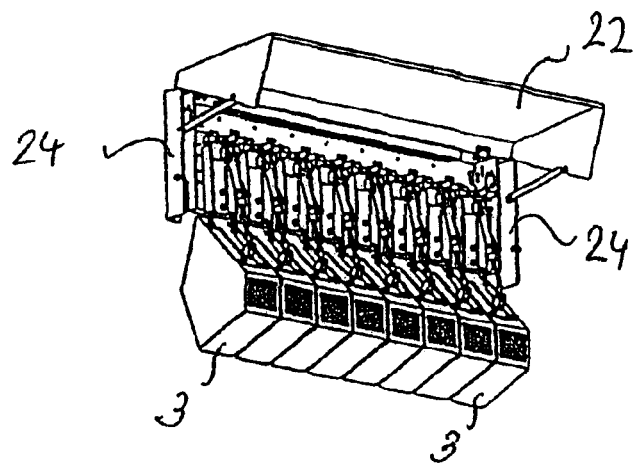
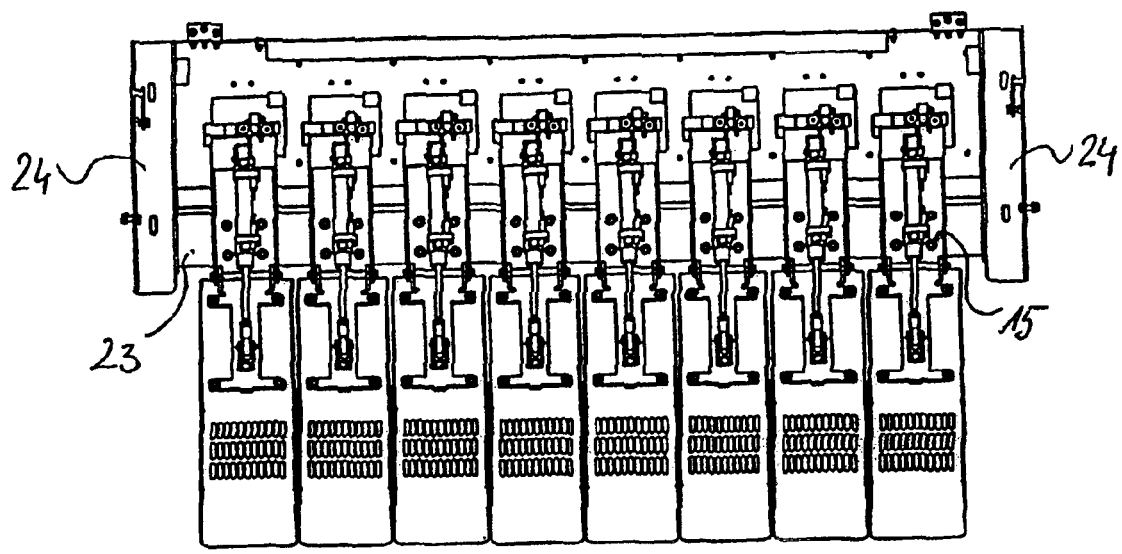
Fig._5

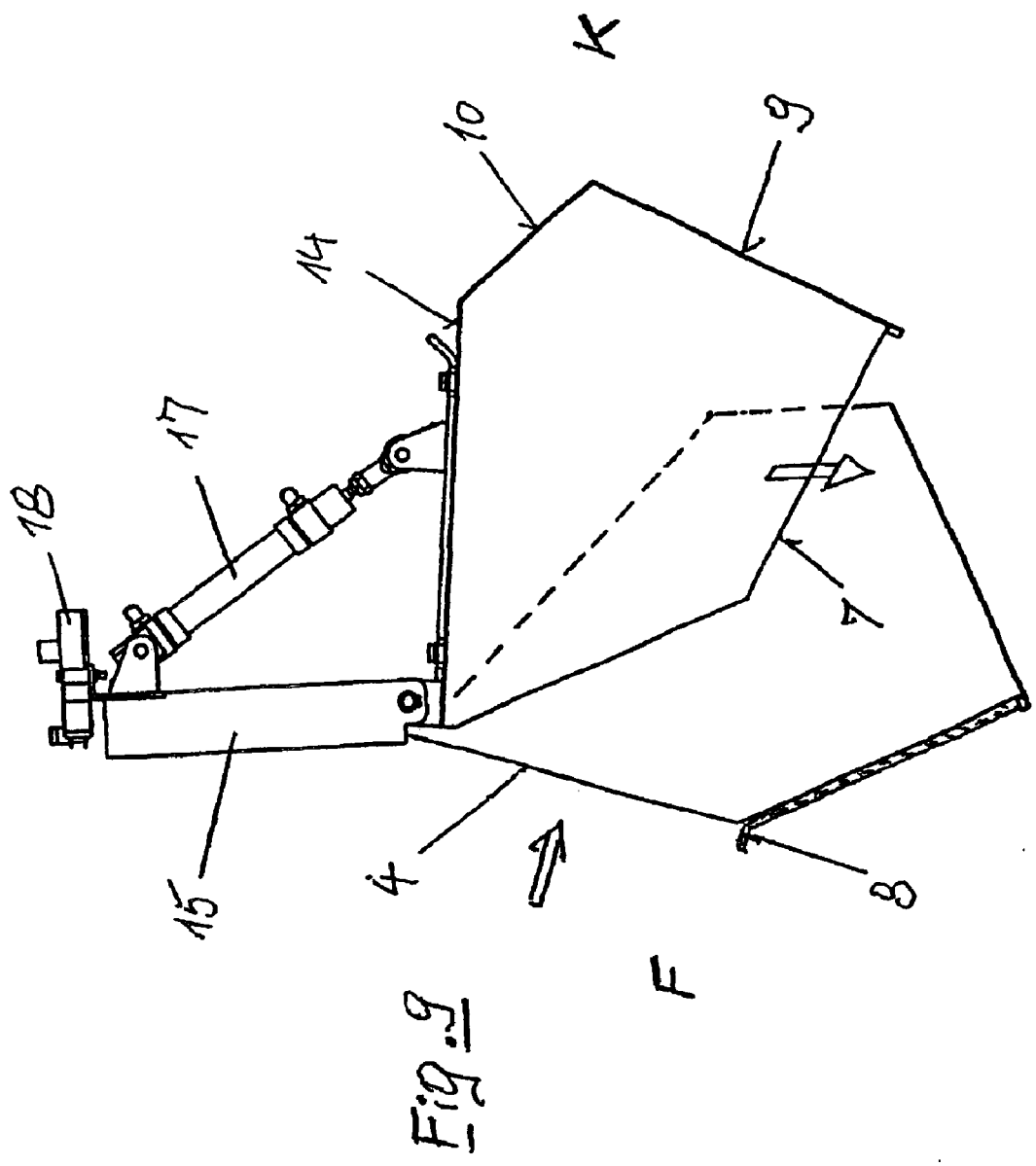

COMMISSIONING DEVICE WITH INTERMEDIATE STORAGE AREAS IN THE FORM OF TILTABLE CONTAINERS ARRANGED ON A SHELF

FIELD OF THE INVENTION

The present invention pertains to a commissioning device with intermediate storage areas in the form of tiltable containers with filling openings, which are arranged on a shelf essentially horizontally in the longitudinal direction of the shelf, and with a lower collecting conveyor, central conveyor or buffer associated with the tiltable containers in the longitudinal direction of the shelf, wherein one or more containers are filled with selected products preferably simultaneously manually or mechanically in a filling position of the containers for a commissioning order, and the selected products of the commissioning order are released onto the collecting conveyor, central conveyor or buffer by tilting the filled containers into a tilted position, which will then preferably contain all desired products of the commissioning order.

BACKGROUND OF THE INVENTION

Commissioning devices of the above-described type are known, e.g., from AT 403 507 or AT 403 031. The tiltable containers are open at the top and are designed as trays. The trays have a horizontal pivot axis and can be pivoted by 180°. The filling opening of the trays points upward during the filling of the trays with selected products. To empty the trays, the trays are tilted by 180° such that the filling opening points downward and the products present in the tray fall onto a conveyor belt located under it by gravity and are then conveyed to a collection point and are fed into a collecting container, in which all products of one commissioning order will then be located. All trays are connected to a common tilting drive with a circulating chain or a circulating toothed belt and are normally separated by means of a coupling. If selected trays or containers are to be tilted by 180°, the couplings of these trays or containers are closed with the common tilting drive via a central control unit of the commissioning device for the tilting movement and pivoted into the filled position as a result. After emptying the products, the trays or containers return into their starting position, namely, the filling position.

The drawback is the great range of pivoting of 180°. The tiltable containers require much space for pivoting within the overall arrangement of the commissioning device. The tilting operation takes a relatively long time. The pivoted masses are comparatively heavy. The products present in the container are "thrown around" during the 180° pivoting and are subject to increased wear. The central tilting drive operates comparatively sluggishly. Moreover, the tilting drive is subject to wear and malfunction. An interruption in operation in the case of a disturbance also means the failure of the entire commissioning device. Furthermore, a special drawback is that an existing commissioning device can be converted with great effort only, and, in particular, its capacity can be increased with a great effort only. The conversion is very expensive and can be performed by skilled personnel only.

SUMMARY OF THE INVENTION

The object of the present invention is to provide a commissioning device of the type described in the introduction, which has a simple and compact design and can be equipped with simple intermediate storage areas of tiltable containers in various variants in a versatile manner and, in particular, can also be converted. Another object of the present invention is to provide tiltable containers that have a very simple design and are designed such that they can be used in a variable manner.

According to the present invention, each tiltable container has, aside from the filling opening, an open container side, which is kept closed by a stationary shelf wall in the filling position of the container and is open in the tilted position that is away from the stationary shelf wall and forms the release opening of the container, from which the products of the container fall onto the collecting conveyor, central conveyor or buffer.

The stationary shelf wall is preferably a vertical shelf wall or a shelf wall sloped in relation to the vertical, which preferably extends at the front side of the shelf in the longitudinal direction of the shelf.

The open side of the container preferably joins the filling opening of the container.

The open side of the container and the filling opening advantageously extend over the entire width of the container in the longitudinal direction of the container.

The container may have flat walls, wherein at least one flat container bottom, a flat container rear wall and two vertical walls located at spaced locations from one another are provided as flat container side walls in the transverse direction of the container, the open side of the container being located opposite the rear wall of the container.

The rear wall of the container preferably has perforation openings to allow inspection of the inside of the containers also from the outside.

An especially simple design is obtained if the two vertical walls are identical.

In a special embodiment, the two vertical walls of the container have five corners, and not only the above-mentioned wall, but an additional flat fastening wall is additionally also provided above the rear wall of the container and behind the filling opening, and a preferably vertical shelf fastening bracket can be fastened at the top side to the said additional flat fastening wall. At its lower end, the shelf fastening bracket has a horizontal pivot axis, at which the container is fastened in a suspended manner and can be pivoted backward and forward in the transverse direction of the shelf.

The open side of the container and the filling opening may form an angle ranging from 180° to about 150°.

The angle between the open side of the container and the container bottom is preferably about 90°.

Each container preferably has a separate tilting drive. The tilting drive is fastened especially to the shelf fastening bracket together with a tilt control means of the container.

The tilting drive is a preferably pneumatically operated piston-and-cylinder means, which is articulated to the fastening wall eccentrically to the pivot axis.

Pressure may be admitted to the piston of the piston-and-cylinder means on one side or on two sides.

The tilt control means comprises, in particular, a control valve that can be operated electromagnetically.

The container including the shelf fastening bracket, the tilting drive and the tilt control means is preferably one assembly unit or a built-in module of the shelf of the commissioning device.

The shelf fastening bracket, the tilt drive as well as the tilt control means preferably have a width that is smaller than or equal to the width of the container.

A stationary container wall made in one piece is intended especially for a plurality of assembly units or built-in modules arranged at closely spaced locations next to one another.

A plurality of containers may be arranged next to each other and/or one after another in one or more shelf planes located one on top of another.

The stationary shelf wall is preferably a built-in part of a shelf, which can be built up variably from a frame system according to the modular principle.

An above-mentioned tiltable container may be preferably used together with additional containers of the same type in a shelf of a commissioning device and/or in a non-commissioning shelf and may be preferably able to be built in as one assembly unit or built-in module. A plurality of shelves may be provided here in a row or in parallel, especially also as a double shelf.

Consequently, no "container" in the conventional sense of the word, in which products can be stored intermediately, is provided as a tiltable container when considered in itself, but only a container part, which acts as an intermediate storage area only together with a fixed shelf wall. The container part is located in the filling position of the container in contact with the fixed shelf wall, and it is only then that the products filled in are held in the container. The fixed shelf wall is vertical or is at an angle to the vertical, sloped downward toward the inside in the transverse direction of the shelf. As a result, only a small container (mass) part is needed relative to a large capacity of the container, and this small container part must be moved rearward and upward from the fixed shelf wall in the transverse direction of the shelf into the tilted position for opening the container. Due to the small moving masses, very rapid cycling or tilting of the container is possible. Assuming a corresponding opening velocity, the container bottom is quasi "pulled away" under the produces filled into the container. The products fall by free fall downward onto the collecting conveyor or buffer located at a closely spaced location as filled in, without lateral slipping or circulating movement, and cannot be caught, as it happens in the state of the art. The opened container can also be returned correspondingly rapidly into the normal starting position, namely, the filling position, from the tilted position, and the containers are then available for further filling. The tilting movement describes an angle not greater than about 30° to at most 45°. Due to the low moved weight of the container and the small tilt angle, the tilting drive can be designed as a tilting drive with low output despite the high capacity of the container. The small tilt angle requires little installation space for a container in the shelf in the transverse direction of the shelf. The products are stored intermediately on a shelf in a shelf plane in a pocket extending comparatively far in the downward direction. The containers have only a small width relative to the depth of the container in the downward direction. The container fastening with all attached and built-in parts of the shelf fastening bracket, of the tilting drive and of the tilt control means are also located within the narrow width of the container. An above-mentioned container is preferably a single modular component, which can be accommodated together with other modules at closely spaced locations on a shelf in a space-saving manner. Individual module parts located at closely spaced locations next to each other can also form together a package in a modular form, which can then be installed in a shelf simply and rapidly. The individual shelf fastening brackets are then premounted on a transverse plate, together with the electric connection lines, e.g., for the various control valves that can be actuated electromagnetically and the pneumatic connection lines for the various tilting drives in the form of pneumatic piston-and-cylinder means.

The container with its individual components or a container group consequently forms a modular unit, which can be preferably attached to any desired system.

No mechanical auxiliary means, such as a catch or the like, are necessary for the "container closed" state or for the state of the filling position. The action of the force of gravity is primarily sufficient for the closed state. This state is supported during the operation by the pressure of the opened extended pneumatic cylinder.

The velocity of movement of the tiltable containers can be set.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

FIG. 4 is a perspective view of the tiltable containers according to FIG. 1;

FIG. 5 is a schematic side view of the tiltable containers according to FIG. 4;

FIG. 9 is a side view showing the tiltable container shown in FIGS. 6 through 8 in its lowered filling position as well as in its pivoted, raised tilting position, with representation of a fixed shelf wall, which is part of each shelf.

DESCRIPTION OF THE PREFERRED EMBODIMENT

Figure 1:
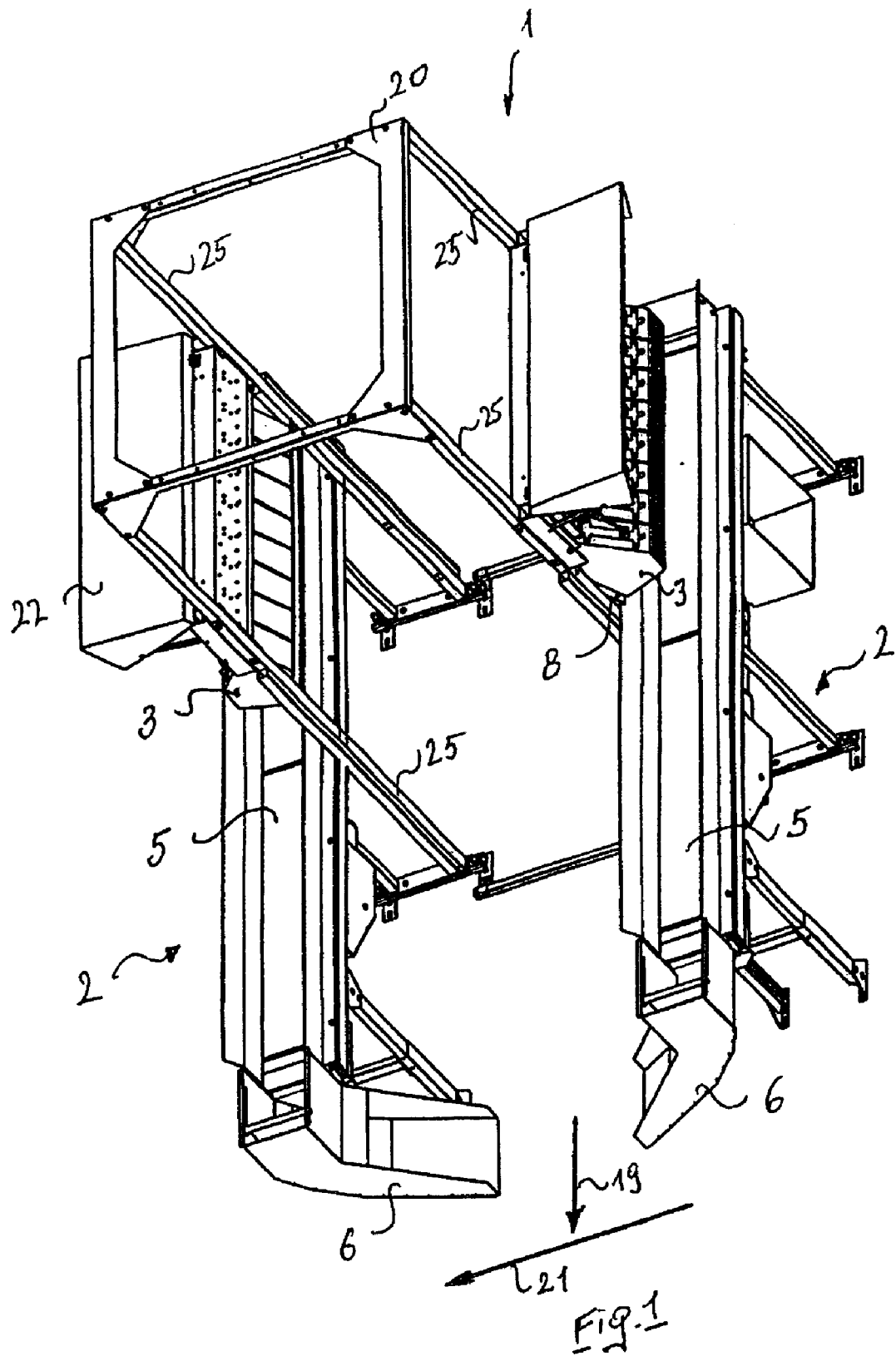
FIG. 1 is a perspective view of a commissioning device with two shelves in the form of a double shelf with associated collecting conveyors and tiltable containers arranged above them as intermediate storage areas.
Figure 3:
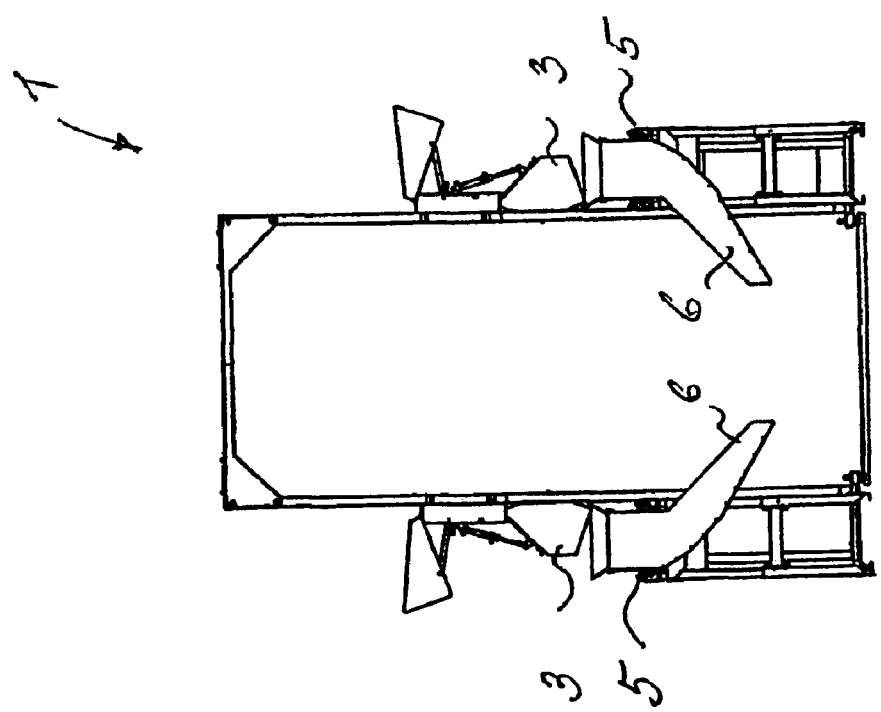
FIG. 3 is a schematic front view of the commissioning device according to FIG. 1.
Figure 2:
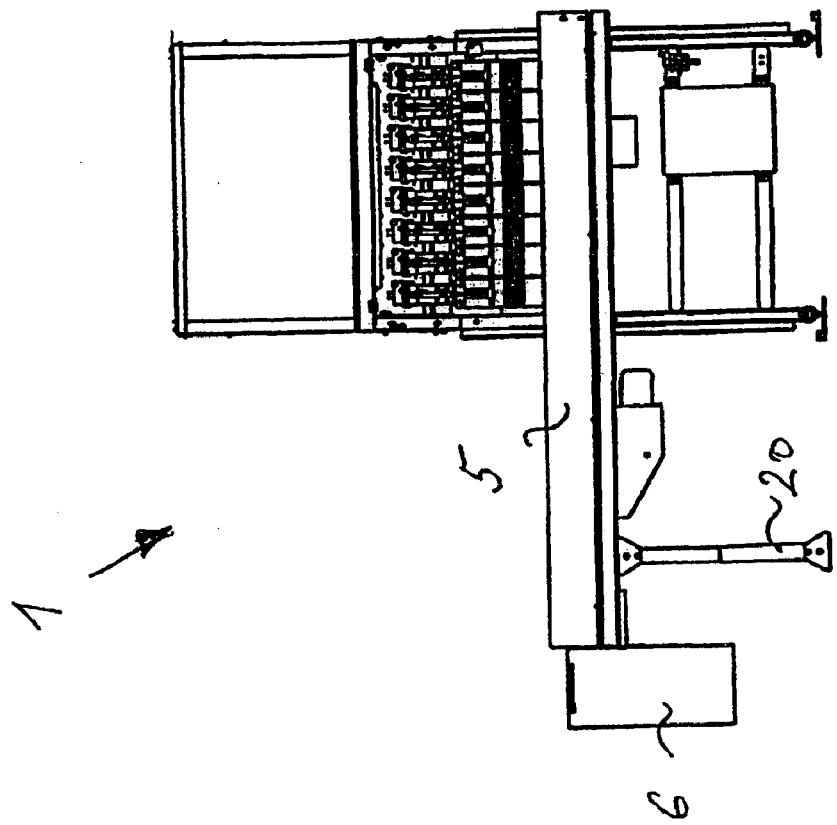
FIG. 2 is a schematic side view of the commissioning device according to FIG. 1.

Referring to the drawings in particular, a commissioning device 1 comprises two shelves 2 designed as a double shelf with intermediate storage areas arranged horizontally in the longitudinal direction of the shelf in the form of tiltable containers 3.

A collecting conveyor 5 each with chutes 6 arranged at the longitudinal ends in the direction of the center of the double shelf is located under the tiltable containers 3.

A central conveyor, which is symbolically indicated by the arrow 19 and which is joined at the longitudinal end by a cross belt, which is symbolically illustrated by the arrow 21 and on which collecting containers, not shown, are moved cyclically, is located in the middle of the double shelf in the longitudinal direction of the shelf.

Each collecting container is intended for a complete commissioning order.

For an individual commissioning order, one or more containers 3 are filled with selected products preferably simultaneously manually or mechanically in a filling position F of the containers.

By tilting the filled containers into a tilted position K according to FIG. 9, the selected products of the commissioning order are released onto the collecting conveyor or conveyors 5, and they reach from there via chutes 6 the central conveyor 19 and from there the associated collecting container, which is moved cyclically to the longitudinal end of the central conveyor 19 on the cross belt 21.

All control operations, especially also the tilting operations of the tiltable containers 3, are performed by a central electronic control unit, not shown.

The tiltable containers 3 are designed at each individual shelf 2 as a modular package according to FIGS. 4 and 5.

In the exemplary embodiment shown in the drawings, eight individual tiltable containers 3 are mounted at closely spaced locations next to each other at a vertical longitudinal wall 23. The longitudinal wall 23 has, furthermore, vertical fastening webs 24, and an upper horizontal cover 22 that is, furthermore, provided as a protection for the pivotable individual parts of the containers 3.

The above-mentioned modular package of the tiltable containers 3 is mounted at vertical posts 25 of the shelf 2 above the section of the subjacent collecting conveyor 5 located there in the longitudinal direction of the shelf, on the front side of the shelf, which always points toward the middle of the double shelf.

The modular package is fastened to the shelf 2 such that a fixed shelf wall 8, which is essentially vertical or is sloped in relation to the vertical and is located on the front side of the shelf in the longitudinal direction of the shelf between the posts 25, is in a special contact with the containers 3 according to FIG. 9 when the containers 3 are in their filling position F. In particular, an open container side 7 of the container is completely covered now, and it is only now that the container 3 forms a fillable container.

The fixed or stationary shelf wall 8 is a built-in part of the shelf 2, which may be built up, in principle, variably according to the modular principle.

Each tiltable container 3 can be pivoted backward and upward between a lowered filling position F and a tilting position K in the transverse direction of the shelf, as is illustrated especially in FIG. 9.

Figure 8:
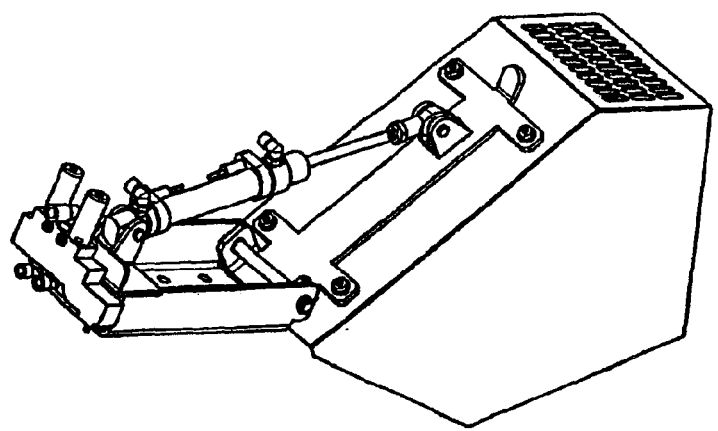
FIG. 8 is a perspective view of an individual tiltable container according to FIGS. 1 through 5 in the lowered filling position.
Figure 7:
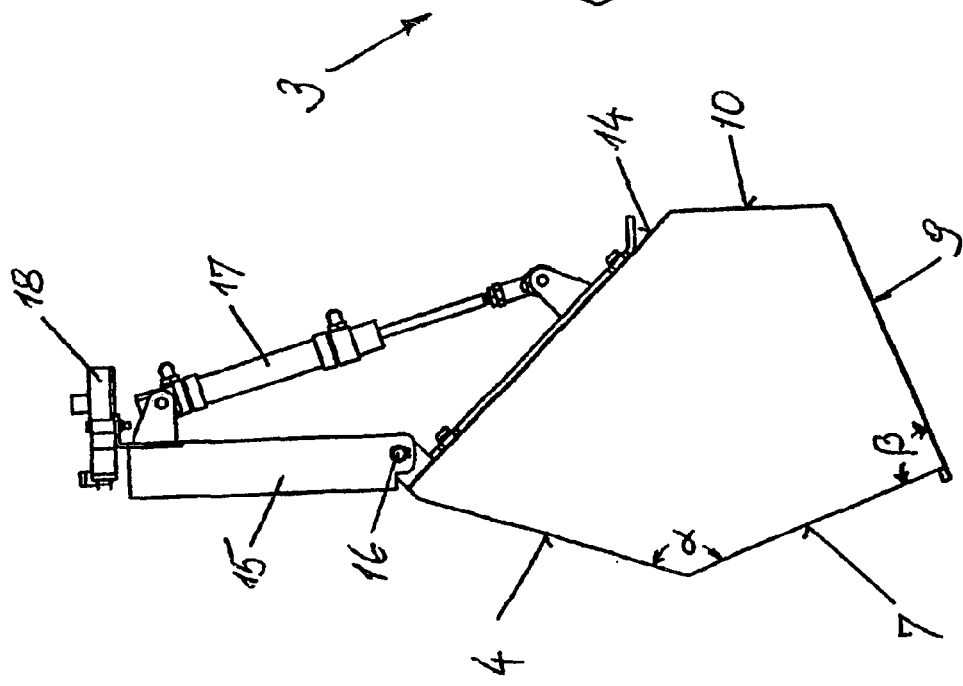
FIG. 7 is a side view of an individual tiltable container according to FIGS. 1 through 5 in the lowered filling position.
Figure 6:
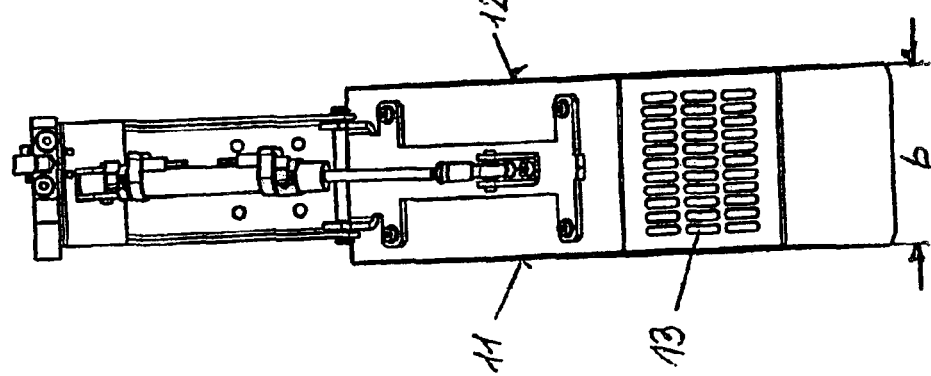
FIG. 6 is a rear view of an individual tiltable container according to FIGS. 1 through 5 in the lowered filling position.

As can be determined especially from FIGS. 6 through 9, each tiltable container 3 has, among other things, a filling opening 4 as well as the open container side 7 already referred to above under it in the transverse direction of the shelf on the front side of the shelf.

The tiltable container 3 is consequently kept closed in its filling position F by a stationary shelf wall 8 and is filled with products from the front side of the shelf.

If the tiltable container 3 is in its tilted position K, the open container side 7 is away from the stationary shelf wall 8. The open container side 7 now acts as a release opening of the container 3, from which the products of the container 3 fall downward onto the collecting conveyor 5, as is illustrated especially by the arrow in the right-hand part in FIG. 9.

The open container side 7 and the filling opening 4 extend over the entire container width b in the longitudinal direction of the container.

Each individual tiltable container 3 has flat walls, and a flat container bottom 9, a flat container rear wall 10 and two vertical walls 11, 12 arranged at spaced locations from one another are provided as flat container side walls in the transverse direction of the shelf. The open container side 7 is located opposite the container rear wall 10. The container rear wall 10 has perforation openings 13. The two vertical walls 11, 12 are identical and have a pentagonal top view.

A flat fastening wall 14, at which a vertical shelf fastening bracket 15 is provided on the top side, is located above the container rear wall 10 and behind the filling opening 4.

At its lower end, the shelf fastening bracket 15 has a horizontal pivot axis 16, at which the container 3 is fastened in a suspended manner and is pivotable rearward and upward in the transverse direction of the shelf.

The open container side 7 and the filling opening 4 form an angle α of about 150° in the exemplary embodiment. The open container side 7 and the container bottom 9 form an angle β of 90°.

The shelf fastening bracket 15 has a tilting drive 17 and a tilt control means 18 for the container 3.

The tilting drive 17 is, in particular, a pneumatic piston-and-cylinder means, which is articulated to the upper, rear fastening wall 14 of the container 3 eccentrically to the pivot axis 16.

The tilt control means 18 comprises a control valve, which can be actuated electromagnetically and is in a pneumatic line connection with the piston-and-cylinder means. The pneumatic line connection is supplied via a collection line, not shown.

Each tiltable container 3 including the shelf fastening bracket 15, the tilting driver 17 and the tilt control means 18 represents an assembly unit or built-in module in itself, which is installed in a shelf 2 in itself or, in the exemplary embodiment being shown, in conjunction with other tiltable containers as a package. The shelf fastening brackets 15 of all tiltable containers 3 of the package are fastened to the above-mentioned longitudinal wall 23. The stationary shelf wall 8 made in one piece is consequently provided for a plurality of assembly units or built-in modules arranged at closely spaced locations next to one another.

The shelf fastening bracket 15, the tilting drive 17 and the tilt control means 18 have a width that is smaller than the width b of the container.

The above-mentioned overall intermediate buffer storage system consequently comprises a frame system for receiving the components, a container system as a buffer storage system for the products, a collecting belt system for the order-related removal of the products, a chute system for transporting the products from the collecting belt system onto the central belt system and/or into another buffer device.

The container system may be designed as a system comprising n containers. The individual containers may be divided several times vertically and horizontally.

The emptying of the containers is performed in an order-related manner by a tilting movement onto the collecting belt system or, depending on the use, also directly onto a central belt system and/or into a buffer device.

In connection with the above-mentioned components (fastenings, mounts, cylinder, valve), the container represents a module.

Due to its modularity, the container storage system may be preferably arranged at different static shelves or automatic commissioning units as a buffer storage unit.

The containers may be arranged in series and/or in parallel.

The buffer storage system is controlled by means of a software system or an automatic control software that belongs to the field of use of the buffer storage system.

In one function of the buffer storage system, products are transferred to the container system automatically or manually into the container opening. Products may be preferably stored or buffered without restrictions in terms of shape corresponding to the usual product standards of a retail or wholesale trade within the possible maximum dimensions. The container is moved rearward by a tilting movement, as a result of which the container bottom (underside of the container) describes a circular path, so that the products can be guaranteed a relatively short fall time. The emptying of the containers is performed in an order-related manner.

While a specific embodiment of the invention has been shown and described in detail to illustrate the application of the principles of the invention, it will be understood that the invention may be embodied otherwise without departing from such principles.

What is claimed is:

1. A commissioning device, comprising:
    tiltable containers with intermediate storage areas arranged on a shelf essentially horizontally in the longitudinal direction of the shelf, said tiltable containers each having a filling opening, said shelf having a stationary shelf wall;
    a lower collecting conveyor, central conveyor or buffer associated with said tiltable containers, said lower collecting conveyor, central conveyor or buffer extending in a longitudinal direction of the shelf, wherein one or more said containers are filled manually or mechanically with selected products individually or simultaneously in a filling position of said tiltable containers for a commissioning order, and the selected products are released onto said collecting conveyor, central conveyor or buffer by tilting the filled containers into a tilted position and the selected products are fed via said collecting conveyor, central conveyor or buffer to a collecting container so as to contain all the desired products of the commissioning order, each tiltable container further having an open container side, in addition to said filling opening, maintained closed in the filling position of the container by said stationary shelf wall and open in the tilted position that is away from said stationary shelf wall and forms a release opening of said container from which the products of the container fall onto said collecting conveyor, central conveyor or buffer.

2. A commissioning device in accordance with claim 1, wherein said container has flat wall, wherein at least one flat container bottom, a flat container rear wall and two vertical walls located at spaced locations from one another are provided as said flat container side walls in a transverse direction of said shelf, and said open container side is located opposite said container rear wall.

3. A commissioning device in accordance with claim 2, wherein said two vertical walls have an identical design.

4. A commissioning device in accordance with claim 2, wherein said two vertical walls have a pentagonal design, and an additional flat fastening wall is provided above said container rear wall and behind said filling opening, and a preferably vertical shelf fastening bracket is provided on a top side at said additional flat fastening wall, and said vertical shelf fastening bracket has at its lower end a horizontal pivot axis, at which said container is fastened in a suspended manner and is pivotable backward and forward in the transverse direction of the shelf.

5. A commissioning device in accordance with claim 4, wherein said shelf fastening bracket has a tilting drive and a tilt control means for each container.

6. A commissioning device in accordance with claim 5, wherein said tilt control means comprises a control valve that can be actuated electromagnetically.

7. A commissioning device in accordance with claim 5, wherein said containing, said shelf fastening bracket, said tilting drive and said tilt control means form an assembly unit or built-in module for said shelf.

8. A commissioning device in accordance with claim 7, wherein a stationary shelf wall made in one piece is provided for a plurality of assembly units or built-in modules arranged at closely spaced locations next to one another.

9. A commissioning device in accordance with claim 5, wherein said shelf fastening bracket, said tilting drive and said tilt control means have a width that is smaller than or equal to said container width.

10. A commissioning device in accordance with claim 1, wherein said open container side and said container bottom form an angle β of about 90°.

11. A commissioning device in accordance with claim 1, wherein a plurality of said containers are arranged next to one another and/or one after another in one or more shelf planes located one on top of another.

12. A commissioning device in accordance with claim 1, wherein said stationary shelf wall is a built-in part of a shelf, which can be built up variably from a frame system with modular parts.

13. Tiltable containers, the containers comprising intermediate storage areas arranged on a shelf essentially horizontally in the longitudinal direction of the shelf, said tiltable containers each having a filling opening, said shelf having a stationary shelf wall tilting the filled containers into a tilted position, each tiltable container further having an open container side, in addition to said filling opening, maintained closed in the filling position of the container by said stationary shelf wall and open in the tilted position that is away from said stationary shelf wall and forms a release opening of said container from which the products of the container fall, said containers being used together within the shelf as part of a commissioning device and/or in a non-commissioning shelf.

14. A commissioning device, comprising:
    tiltable containers with intermediate storage areas arranged on a shelf essentially horizontally in the longitudinal direction of the shelf, said tiltable containers each having a filling opening, said shelf having a stationary shelf wall;
    a lower collecting conveyor, central conveyor or buffer associated with said tiltable containers, said lower collecting conveyor, central conveyor or buffer extending in a longitudinal direction of the shelf, wherein one or more said containers are filled manually or mechanically with selected products individually or simultaneously in a filling position of said tiltable containers for a commissioning order, and the selected products are released onto said collecting conveyor, central conveyor or buffer by tilting the filled containers into a tilted position and the selected products are fed via said collecting conveyor, central conveyor or buffer to a collecting container so as to contain all the desired products of the commissioning order, each tiltable container further having an open container side, in addition to said filling opening, maintained closed in the filling position of the container by said stationary shelf wall and open in the tilted position that is away from said stationary shelf wall and forms a release opening of said container from which the products of the container fall onto said collecting conveyor, central conveyor or buffer, said stationary shelf wall being a shelf wall that is vertical or sloped in relation to vertical and extends on a front side of said shelf in a longitudinal direction of said shelf.

15. A commissioning device in accordance with claim 14, wherein said open container side joins said filling opening of said container in a downward direction.

16. A commissioning device in accordance with claim 14, wherein said open container side and said filling opening extend over an entire container width in a longitudinal direction of the shelf.

17. A commissioning device, comprising:

tiltable containers with intermediate storage areas arranged on a shelf essentially horizontally in the longitudinal direction of the shelf, said tiltable containers each having a filling opening, said shelf having a stationary shelf wall;

a lower collecting conveyor, central conveyor or buffer associated with said tiltable containers, said lower collecting conveyor, central conveyor or buffer extending in a longitudinal direction of the shelf, wherein one or more said containers are filled manually or mechanically with selected products individually or simultaneously in a filling position of said tiltable containers for a commissioning order, and the selected products are released onto said collecting conveyor, central conveyor or buffer by tilting the filled containers into a tilted position and the selected products are fed via said collecting conveyor, central conveyor or buffer to a collecting container so as to contain all the desired products of the commissioning order, each tiltable container further having an open container side, in addition to said filling opening, maintained closed in the filling position of the container by said stationary shelf wall and open in the tilted position that is away from said stationary shelf wall and forms a release opening of said container from which the products of the container fall onto said collecting conveyor, central conveyor or buffer, said container having flat walls, wherein at least one flat container bottom, a flat container rear wall and two vertical walls located at spaced locations from one another are provided as said flat container side walls in a transverse direction of said shelf, and said open container side is located opposite said container rear wall, said container rear wall having perforation openings.

18. A commissioning device, comprising:

tiltable containers with intermediate storage areas arranged on a shelf essentially horizontally in the longitudinal direction of the shelf, said tiltable containers each having a filling opening, said shelf having a stationary shelf wall;

a lower collecting conveyor, central conveyor or buffer associated with said tiltable containers, said lower collecting conveyor, central conveyor or buffer extending in a longitudinal direction of the shelf, wherein one or more said containers are filled manually or mechanically with selected products individually or simultaneously in a filling position of said tiltable containers for a commissioning order, and the selected products are released onto said collecting conveyor, central conveyor or buffer by tilting the filled containers into a tilted position and the selected products are fed via said collecting conveyor, central conveyor or buffer to a collecting container so as to contain all the desired products of the commissioning order, each tiltable container further having an open container side, in addition to said filling opening, maintained closed in the filling position of the container by said stationary shelf wall and open in the tilted position that is away from said stationary shelf wall and forms a release opening of said container from which the products of the container fall onto said collecting conveyor, central conveyor or buffer, said open container side and said filling opening form an angle ($\alpha$) of 180° to about 150°.

19. A commissioning device, comprising:

tiltable containers with intermediate storage areas arranged on a shelf essentially horizontally in the longitudinal direction of the shelf, said tiltable containers each having a filling opening, said shelf having a stationary shelf wall;

a lower collecting conveyor, central conveyor or buffer associated with said tiltable containers, said lower collecting conveyor, central conveyor or buffer extending in a longitudinal direction of the shelf, wherein one or more said containers are filled manually or mechanically with selected products individually or simultaneously in a filling position of said tiltable containers for a commissioning order, and the selected products are released onto said collecting conveyor, central conveyor or buffer by tilting the filled containers into a tilted position and the selected products are fed via said collecting conveyor, central conveyor or buffer to a collecting container so as to contain all the desired products of the commissioning order, each tiltable container further having an open container side, in addition to said filling opening, maintained closed in the filling position of the container by said stationary shelf wall and open in the tilted position that is away from said stationary shelf wall and forms a release opening of said container from which the products of the container fall onto said collecting conveyor, central conveyor or buffer, said container having flat walls, wherein at least one flat container bottom, a flat container rear wall and two vertical walls located at spaced locations from one another are provided as said flat container side walls in a transverse direction of said shelf, and said open container side is located opposite said container rear wall, said two vertical walls having a pentagonal design, and an additional flat fastening wall is provided above said container rear wall and behind said filling opening, and a preferably vertical shelf fastening bracket is provided on a tope side at said additional flat fastening wall, and said vertical shelf fastening bracket has at its lower end a horizontal pivot axis, at which said container is fastened in a suspended manner and is pivotable backward and forward in the transverse direction of the shelf, said shelf fastening bracket having a tilting drive and a tilt control means for each container, said tilting drive being a pneumatically operated piston-and-cylinder means, which is articulated to said fastening wall eccentrically to said horizontal pivot axis.

20. An article dispensing device comprising:

a shelf frame with a stationary shelf wall fixed to said shelf frame;

a plurality of tiltable containers pivotally arranged on said shelf frame between a filling position and a tilted position, each of said tiltable containers defining a filling opening and an open container side, said shelf wall closing said open container side when said each container is in said filling position and hold an article in said each container, said open container side and said tilted position being arranged to empty said each container by gravity when said each container is in said tilted position, said filling opening and said filling position being arranged to fill said each container when said each container is in said filling position;

a lower article receiver for receiving an article that has been dispensed by gravity from said containers in said tilted position, said lower article receiver conveying or holding the article, said lower article receiver extending in a longitudinal direction of said shelf wall.

* * * * *